Jan. 25, 1944.　　　　T. WHITE　　　　2,340,240
POTATO AND BEAN PLANTER
Filed Feb. 25, 1942　　　5 Sheets-Sheet 2

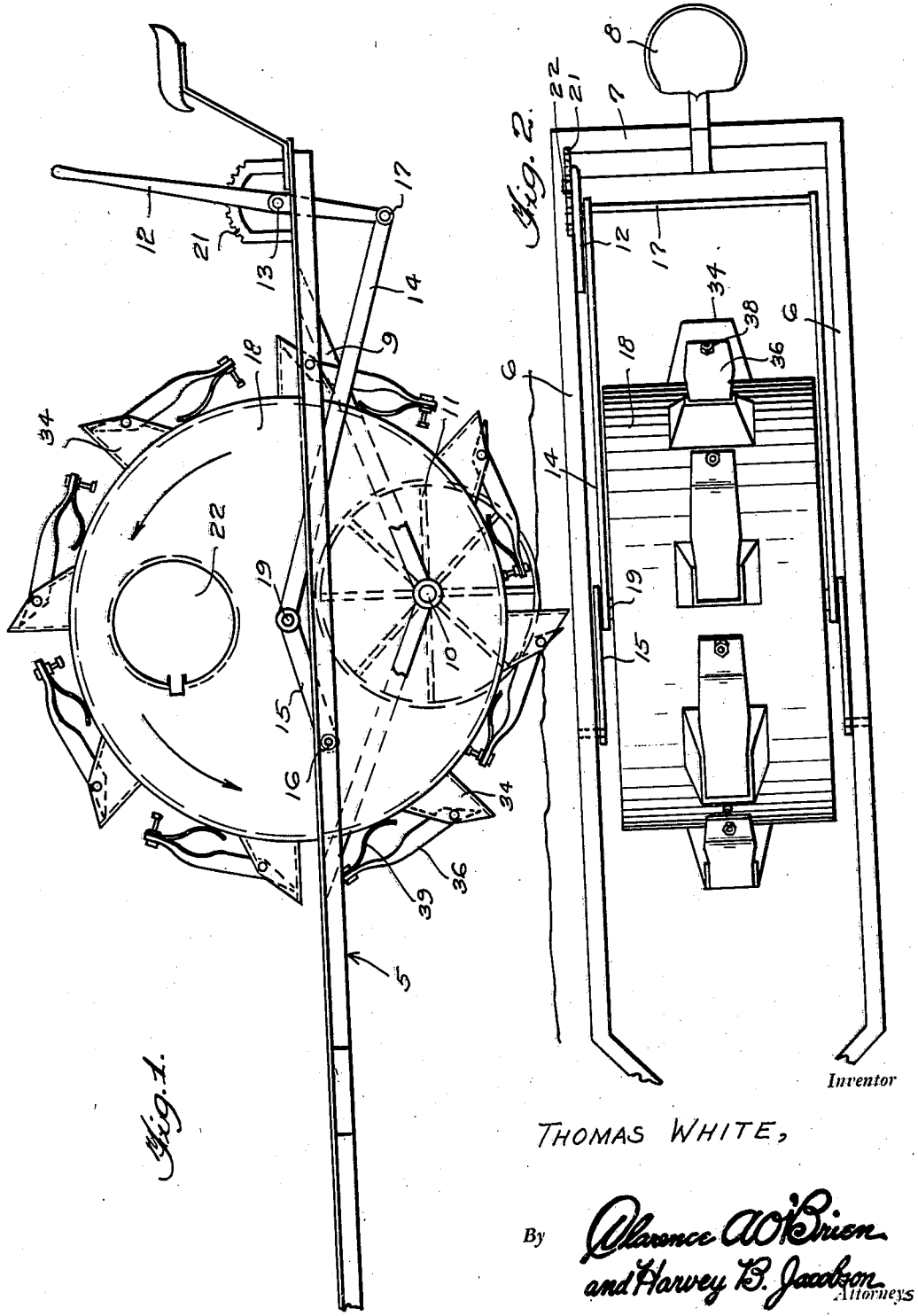

Inventor
THOMAS WHITE,

By Clarence A. O'Brien
and Harvey B. Jacobson
Attorneys

Jan. 25, 1944.    T. WHITE    2,340,240
POTATO AND BEAN PLANTER
Filed Feb. 25, 1942    5 Sheets-Sheet 3
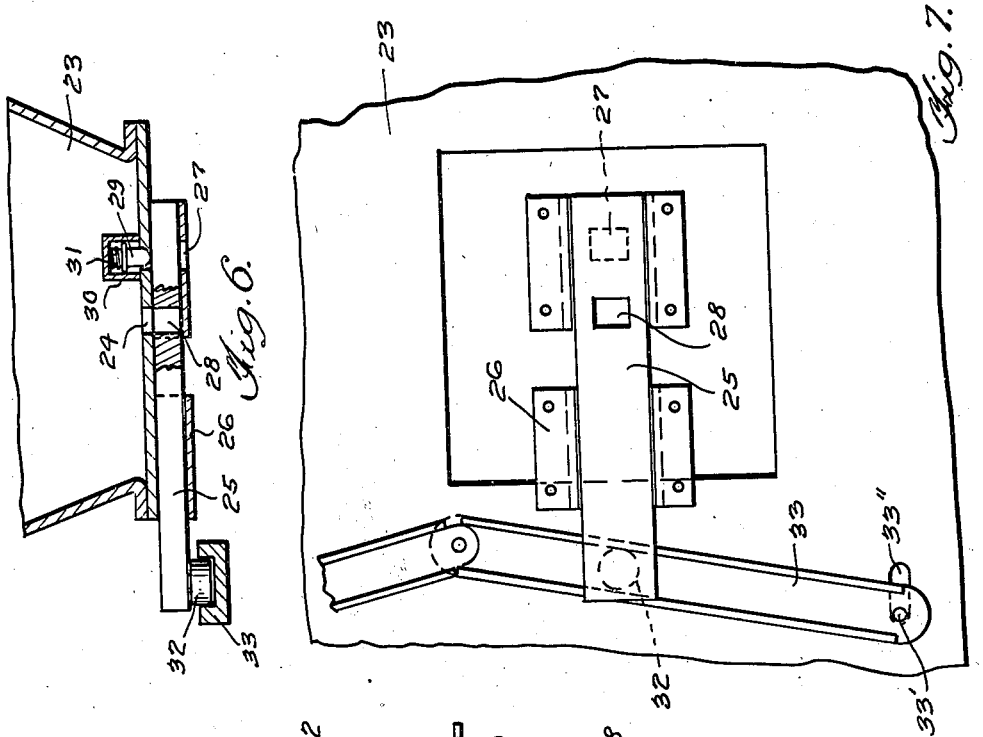
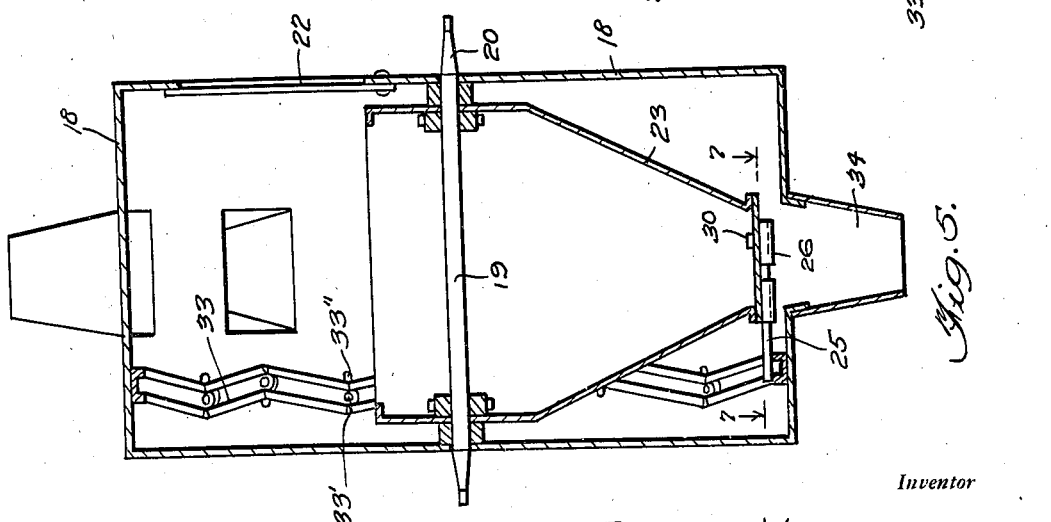
Inventor
THOMAS WHITE
By Clarence A. O'Brien
and Harvey B. Jacobson
Attorneys Jan. 25, 1944. T. WHITE 2,340,240
POTATO AND BEAN PLANTER
Filed Feb. 25, 1942 5 Sheets-Sheet 4

Inventor
THOMAS WHITE,
by Clarence A O'Brien
and Harvey B. Jacobson
Attorneys

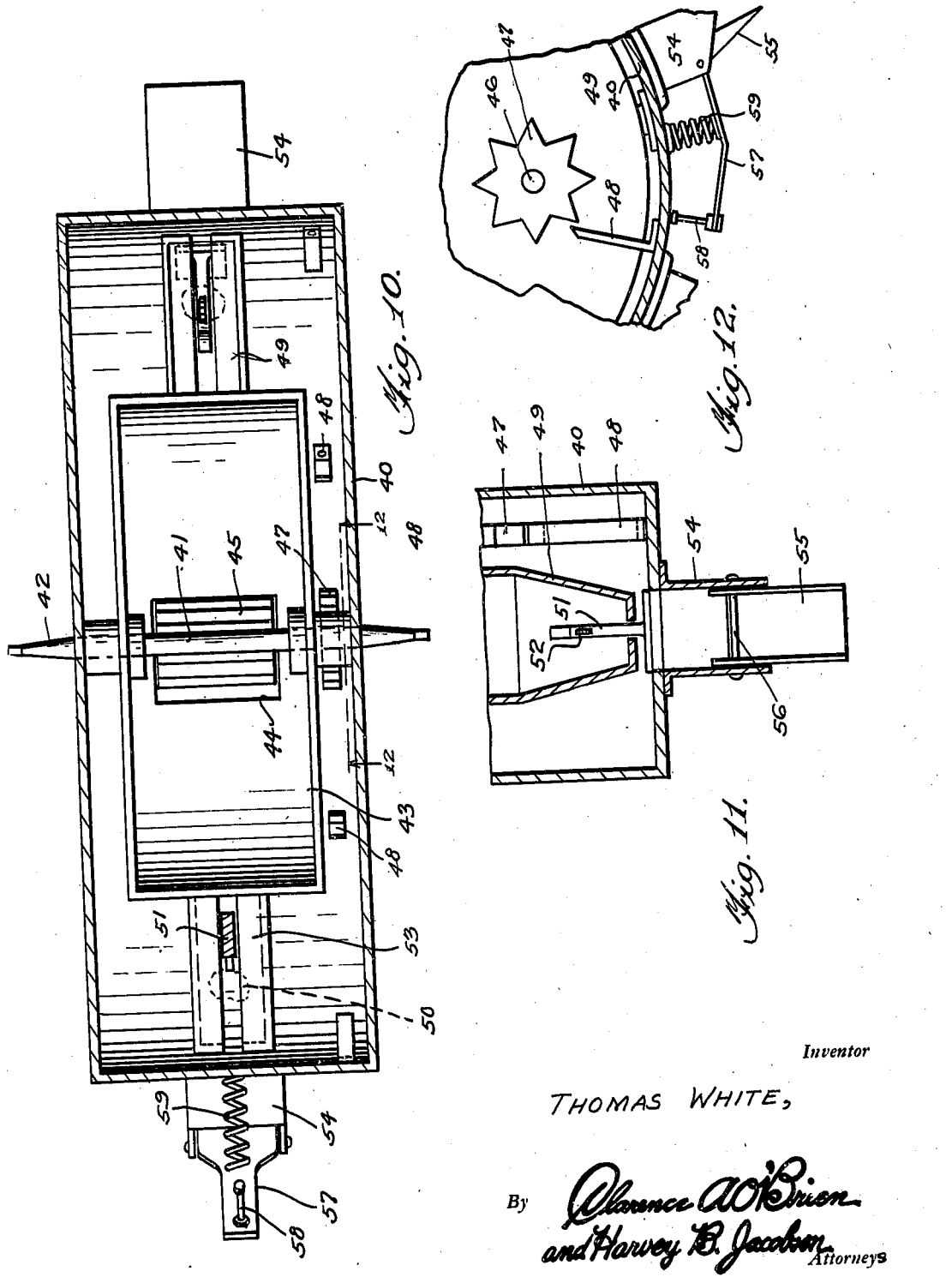

Patented Jan. 25, 1944

2,340,240

UNITED STATES PATENT OFFICE 2,340,240

POTATO AND BEAN PLANTER

Thomas White, Cadillac, Mich.

Application February 25, 1942, Serial No. 432,333

3 Claims. (Cl. 111—91)

The present invention relates to new and useful improvements in planters designed particularly for planting beans and seed potatoes and has for its primary object to provide a wheeled vehicle adapted to travel over the field and to automatically deposit the seed, or seed potatoes, at predetermined intervals in the ground.

A further object of the invention is to provide a device of this character embodying a rotating drum having a plurality of discharge spouts at the peripheral edge thereof and penetrating the ground, the spouts being provided with a closure movable into an open position upon engagement with the ground to deposit the seed therein.

A further object of the invention is to provide interchangeable feed drums adapted for rotatably mounting on the wheeled frame for use in planting either the beans or seed potatoes.

A still further object is to provide an apparatus of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view showing the seed planter mounted in operative position on the planter frame.

Figure 2 is a fragmentary top plan view thereof.

Figure 5 is a vertical sectional view taken substantially on a line 5—5 of Figure 3.

Figure 6 is a sectional view through the control valve for the seed hopper.

Figure 7 is a fragmentary sectional view through the drum and showing the valve for the seed hopper and taken substantially on a line 7—7 of Figure 5.

Figure 10 is a sectional view taken substantially on a line 10—10 of Figure 8.

Figure 11 is a fragmentary sectional view through one of the discharge spouts taken substantially on a line 11—11 of Figure 8, and Figure 12 is a fragmentary detail of the actuating means for the dispensing wheel of the potato planter.

Figure 3:
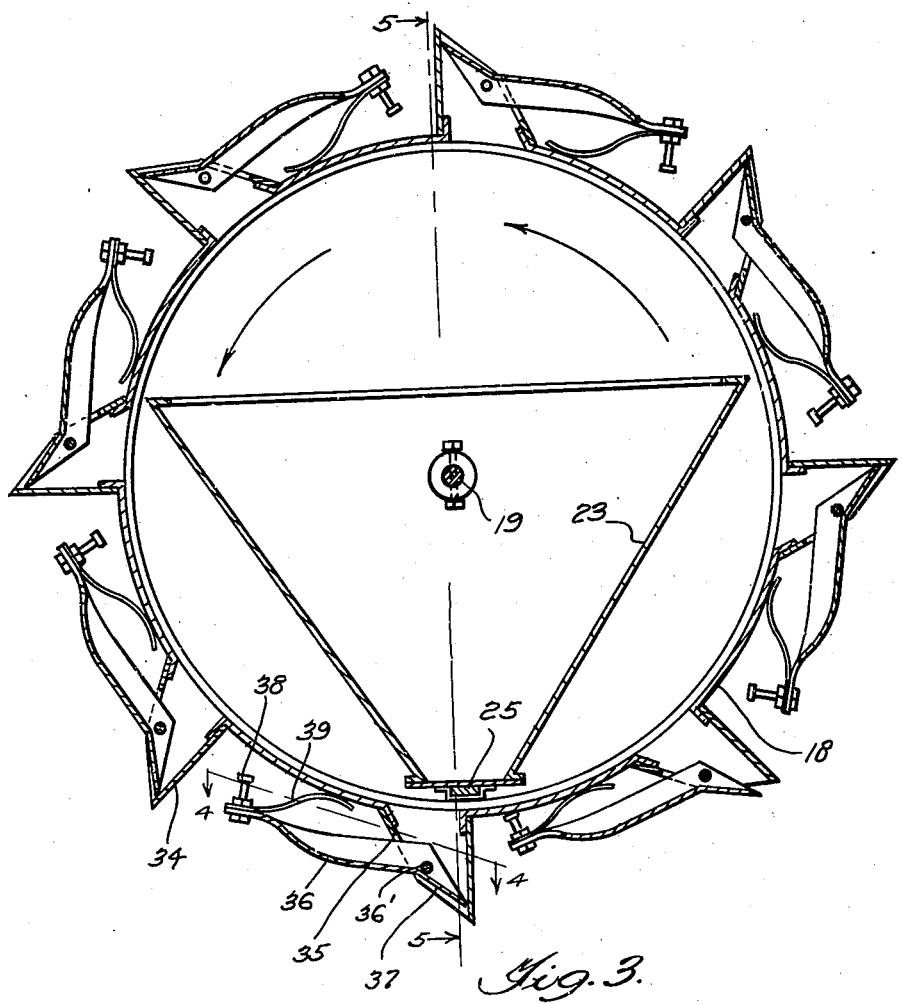
Figure 3 is a sectional view taken transversely of the axis of the drum.
Figure 4:
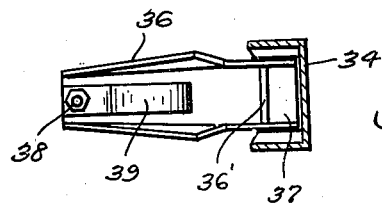
Figure 4 is a fragmentary sectional view through one of the discharge spouts taken substantially on a line 4—4 of Figure 3.

Referring now to the drawings in detail and with particular reference to Figures 1 to 7, inclusive, the numeral 5 designates the planter frame including a pair of spaced parallel longitudinal frame members 6 connected at their rear ends by a transverse frame member 7 and on which the seat 8 is supported. Braces 9 extend downwardly from the frame members 6 for supporting an axle 10 on which the ground wheels 11 are mounted.

A lever 12 is pivoted on a bracket 13 to one of the side frame members 6, adjacent the rear end thereof, the lower end of the lever being pivotally attached to a forwardly extending arm 14, the arm extending upwardly at an inclined angle, as shown to advantage in Figure 1 of the drawings, and on the front end thereof is pivoted a forwardly and downwardly extending link 15 having its front end pivoted as at 16 to the side frame members. One of the arm and link units 14 and 15 is provided for each of the frame members 6 and positioned inwardly thereof, the rear ends of the arms being pivoted on a transverse rod 17.

A planter drum 18 is rotatably supported on a shaft 19 having its ends projecting outwardly from opposite sides of the drum as at 20 and pivotally attached at the meeting ends of the arms 14 and links 15.

Mounted adjacent the lever 12 is a quadrant 21 adapted for engagement by a detent 22 carried by the lever to secure the lever in adjusted position, the manipulation of the lever serving to raise and lower the drum 18.

In one side of the drum is a door 22 for inspection purposes and to feed seed to a hopper 23 positioned in the drum and secured on the shaft 19, it being understood that the shaft is stationary.

In the bottom of the hopper is a discharge opening 24 controlled by a sliding valve 25 mounted in guides 26 secured to the underside of the hopper, one of the guides having a discharge opening 27 therein offset from the opening 24 and the valve 25 likewise has an opening 28 extending therethrough adapted to alternately register with the openings 24 and 27 upon a sliding movement of the valve to receive the seed from the opening 24 and carry the same to the opening 27 for discharging the seed therefrom.

Also mounted in the bottom of the hopper is a plunger 29 disposed immediately above the opening 27, the plunger being enclosed in a housing 30 and having a spring 31 positioned therein for projecting the plunger downwardly whereby to force the seed from the opening 28 through the opening 27.

On one end of the valve 25 is a roller 32 adapted to travel in a sectional cam groove 33 secured to the inside of the drum 18 by means of pins 33' adjustable in slots 33'', the rotation of the drum causing a reciprocating action of the valve 25 by reason of the engagement of the roller 32 in the cam groove 33.

Projecting radially from the peripheral edge of the drum 18, are a plurality of discharge spouts 34 adapted to pass under the opening 27 to receive the seed therefrom. In the rear wall of the spout is an opening 35 through which projects an arm 36 having formed thereon a closure 37 adapted to close the discharge outer end of the spout. The arm 36 at its junction with the closure 37 is pivoted as at 36' to a wall of the spout. To the outer end of the arm 36 is adjustably secured a stop pin 38 projecting radially inwardly with respect to the drum for engaging the drum to limit the opening movement of the closure. The pin 38 also secures one end of a leaf spring 39 which has its free end bearing against the side of the drum to yieldably maintain the closure in a closed position.

As the drum is rotated the spouts 34 are adapted to penetrate into the ground, as shown in Figure 1 of the drawings, whereby to form a hole for depositing the seed therein and as the drum travels over the ground the engagement of the spout with the ground serves to rotate the drum in the direction shown by the arrow and as the arms 36 come into engagement with the ground the closures 36 are opened.

It will also be noted from an inspection of Figure 1 of the drawings that the outer ends of the closure are adapted to dig into the ground in behind the seed so that the seeds are covered in a desired manner.

Figure 8:
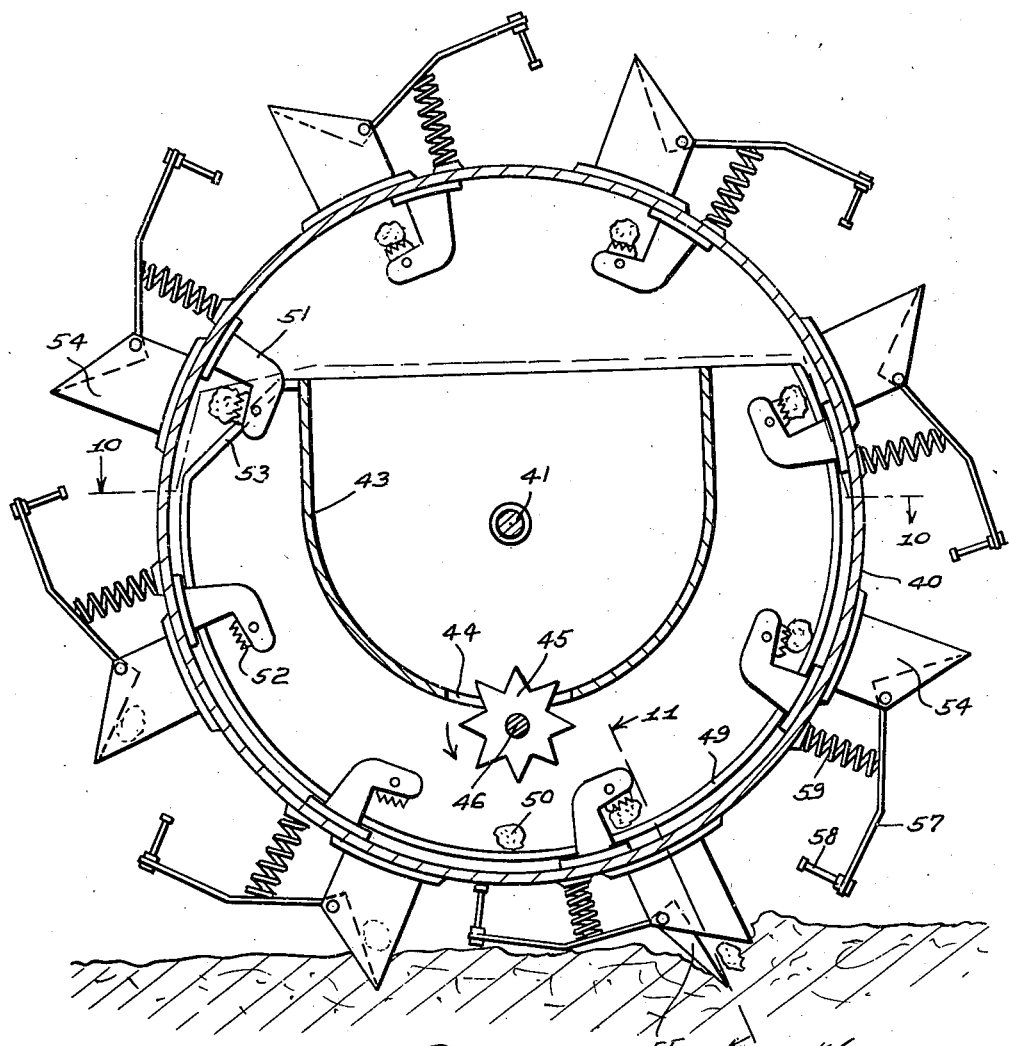
Figure 8 is a sectional view taken transversely of the axis of the potato planting drum.
Figure 9:
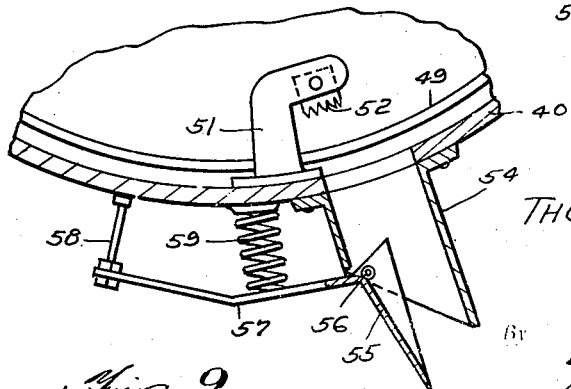
Figure 9 is a fragmentary sectional view through one of the discharge spouts.

In the form of the invention illustrated in Figures 8 to 11, inclusive, I have illustrated a drum adapted for planting seed potatoes, the drum being designated at 40 and is rotatably mounted on the shaft 41 having the trunnions 42 on the ends thereof for securing in the frame as heretofore explained.

Positioned in the drum and fixedly secured to the stationary shaft 41, is the hopper 43 having a discharge opening 44 in its bottom adjacent to which is a star wheel 45 secured on a shaft 46 which is operated by a ratchet 47 on the shaft 46 at the outside of the hopper by means of dogs 48 arranged at spaced intervals within the drum and adapted to successively engage and actuate the ratchet upon rotation of the drum. The star wheel 45 controls the discharge of the seed potatoes from the hopper singly.

Secured to the hopper 43 and spaced from the inner walls of the drum 40 is a pair of spaced guides 49 forming a trough upon which the seed potatoes 50 are adapted to drop from the opening 44. Secured to the inner walls of the drum 40 are a plurality of pickup arms 51 adapted to travel between the guides 49 and having teeth 52 disposed in opposed relation to the surface of the guides for engaging the seed potatoes as the pickup arms travel along the bottom of the hopper as shown at the right-hand side of Figure 8 of the drawings to carry the potatoes upwardly and out of the guides at one end of the hopper, the guides at the other end of the hopper being provided with an inclined edge 53 adapted to engage the seed potatoes to remove the same from the teeth 52 and guide the potatoes toward the inner walls of the hopper for entering the spout 54 as the drum travels past the section 53 of the guide.

Pivoted to the lower edge of the spout 54 is a closure 55 adapted to control discharge of the seed potatoes from the spout, the closure being pivoted as at 56 and having an arm 57 extending therefrom with its outer end provided with an adjustable stop pin 58 for engaging the outer periphery of the drum to limit the opening movement of the closure. A coil spring 59 is interposed between the arm 57 and the adjacent wall of the drum to yieldably urge the closure into its closed position.

The arms 57 are likewise adapted to engage the ground as the drum rotates to open the closure 55 for depositing the potatoes and the outer ends of the closures are likewise adapted to penetrate the soil and cover the potatoes as heretofore explained.

It is believed the details of construction, manner of operation and advantages of the device will be readily understood from the foregoing without further detailed explanation.

Having thus described the invention what I claim is:

1. A planter comprising a wheeled frame, a drum freely rotatable on the frame, a hopper secured in a stationary position in the drum, said hopper having a discharge opening, a stationary trough beneath the opening, means for discharging seed periodically from the hopper into the trough, a plurality of discharge spouts in the drum, and means carried by the drum for picking up seed from the trough and depositing the same into said spouts.

2. A planter comprising a wheeled frame, a drum freely rotatable on the frame, a hopper secured in a stationary position in the drum, said hopper having a discharge opening, a stationary trough beneath the opening, means for discharging seed periodically from the hopper into the trough, a plurality of discharge spouts in the drum, and a plurality of seed pick-up members projecting radially inwardly of the drum and traveling in the trough for conveying seed from the trough to said spouts.

3. A planter comprising a wheeled frame, a drum freely rotatable on the frame, a hopper secured in a stationary position in the drum, said hopper having a discharge opening, a stationary trough beneath the opening, means for discharging seed periodically from the hopper into the trough, a plurality of discharge spouts in the drum, and radially projecting seed pickup members carried by the drum and traveling in the trough and adapted to pick up seed and deposit the same into the spouts.

THOMAS WHITE.